Figure 1:
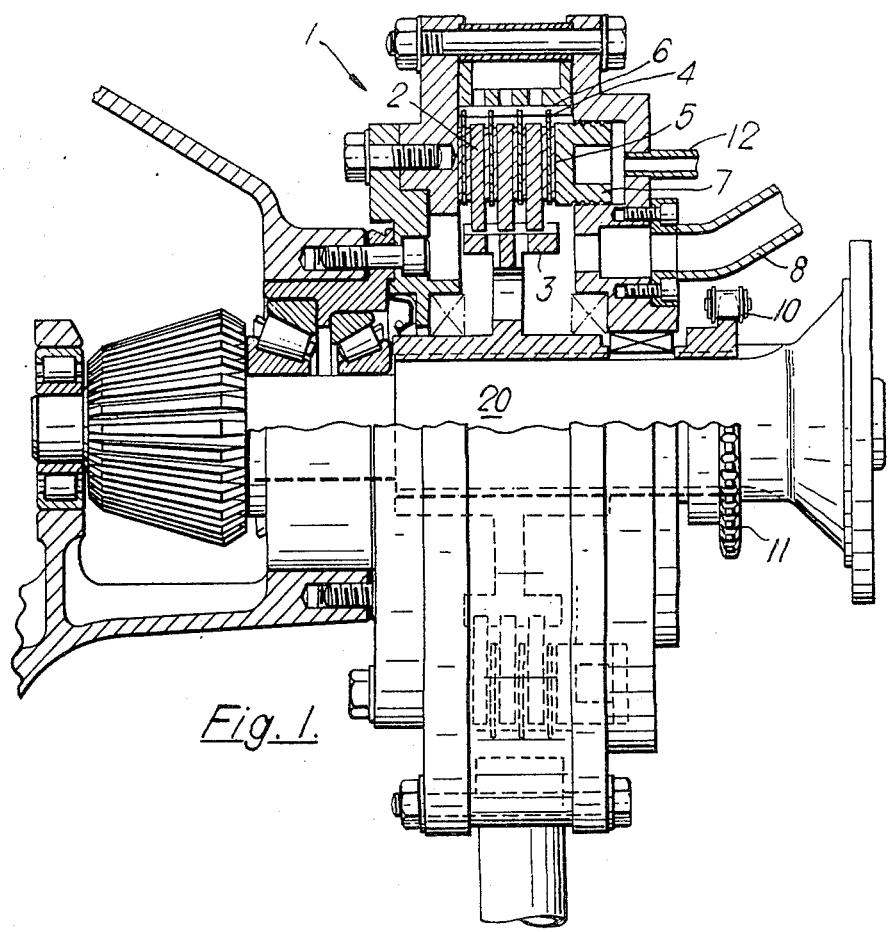

United States Patent [19]
Stirling

[11] 3,960,249
[45] June 1, 1976

[54] VEHICLE RETARDERS
[75] Inventor: Walter Robert Stirling, Buxton, England
[73] Assignee: Ferodo Limited, Manchester, England
[22] Filed: Apr. 17, 1972
[21] Appl. No.: 244,914

Related U.S. Application Data
[63] Continuation of Ser. No. 58,940, July 28, 1970, abandoned.

[30] Foreign Application Priority Data
July 29, 1969 United Kingdom............... 38077/69

[52] U.S. Cl........................... 188/264 F; 188/264 P; 188/264 E; 188/271; 192/113 B
[51] Int. Cl.²...................................... F16D 65/853
[58] Field of Search............ 188/264 F, 271, 264 P, 188/264 E; 192/113 B

[56] References Cited
UNITED STATES PATENTS
1,723,032  8/1929  Harrington ...................... 188/264 F
2,837,192  6/1958  Dunkelow ........................ 188/264 F
2,964,137  12/1960 Luedtke et al................. 188/72.3 X
3,259,216  7/1966  Klaus et al...................... 188/264 F FOREIGN PATENTS OR APPLICATIONS
450,762  8/1949  Italy................................ 188/264 F Primary Examiner—George E. A. Halvosa
Attorney, Agent, or Firm—Sughrue, Rothwell, Mion, Zinn & Macpeak

[57] ABSTRACT

In a vehicle retarder system having a retarder with discs working in oil which is continuously circulated by a pump, a tapping is taken from the oil circuit upstream of a variable but never wholly closed valve to supply oil to an actuator of the retarder. When retardation is required, the valve is partly closed to increase the pressure in the tapping and so to actuate the retarder, while the flow of cooling oil through the retarder continues.

5 Claims, 3 Drawing Figures

Inventor
WALTER ROBERT STIRLING
By Sughrue, Rothwell,
Mion, Zinn & Macpeak
Attorneys

VEHICLE RETARDERS

This is a continuation of application Ser. No. 58,940 filed July 28, 1970, now abandoned.

This invention relates to vehicle retarders, that is to say braking devices carried by heavy road vehicles or by railway wagons, as means for controlling the descent of the vehicle down a hill or slope. Such retarders may be used also as brakes, but commonly are auxiliary to brakes provided for this purpose.

Hydraulically actuated frictional retarders with discs that work in oil are known. Because of the heat generated when the retarder is actuated, the oil must be cooled, and it is circulated through a cooling system by a pump. Normally the cooling system includes a radiator or other heat exchanger.

According to this invention a vehicle retarder system includes a retarder of this kind, a variable but never wholly closed valve in the connection of cooling oil or other liquid between the outlet of the pump and the cooling inlet of the retarder, and a second connection, independent of the valve, from the outlet of the pump to the actuator, whereby liquid is circulated through the retarder so long as the pump is running and, on partial closure of the valve, a change in pressure differential is applied to the actuator through the second connection to actuate the retarder.

During ordinary running, the valve is fully open, and the pressure applied to the actuator via the second connection is not enough to actuate the retarder, whatever the speed of the pump. If, now, the valve is partly closed, the pressure upstream of it is increased, and this increased pressure is applied to the actuator, while the retarder continues to be cooled by the circulating liquid. When the valve is opened again, and the retarder is still hot, the liquid continues to flow through it to cool it.

The greater the extent to which the valve is closed at any given speed of the pump, the greater the increase in pressure upstream of it will be, and accordingly the greater will be the pressure differential applied to the actuator. However, the partial closure of the valve will not affect the flow of cooling liquid through the casing of the retarder but will only increase the pressure of the fluid upstream of the valve, the rate of flow of the liquid either side of the valve being directly proportional to the output of the pump.

To ensure that the retarder does not exert drag when it is not required, means may be provided for ensuring that the actuating pressure is less than and is opposed by the pressure prevailing in the retarder, or one or more springs may be provided in the retarder to separate the engaging frictional surfaces, the pressure exerted by the spring or springs being overcome by the differential pressure when the retarder is to be actuated.

In a road vehicle the valve is manually operated by the driver. If, as is preferably the case in a road vehicle, the pump is driven from the transmission, then increase in the speed of the vehicle will result in increase of the speed and output of the pump and therefore also in increase in the pressure applied to the actuator of the retarder. Accordingly, unless the valve is fully open, the greater the speed of the vehicle, the greater is the retarding effect exerted by the retarder. The actual retarding effect of course depends upon the valve setting, which the driver adjusts appropriately just as a brake is normally applied appropriately.

Figure 2:
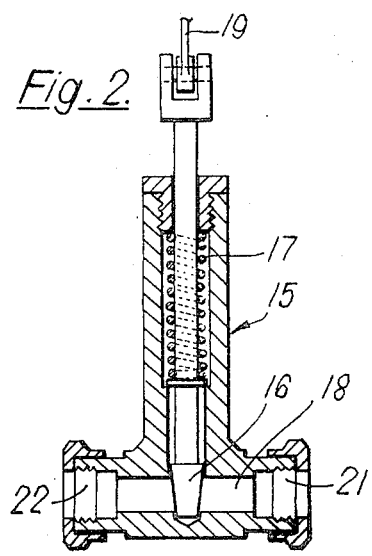
Figure 3:
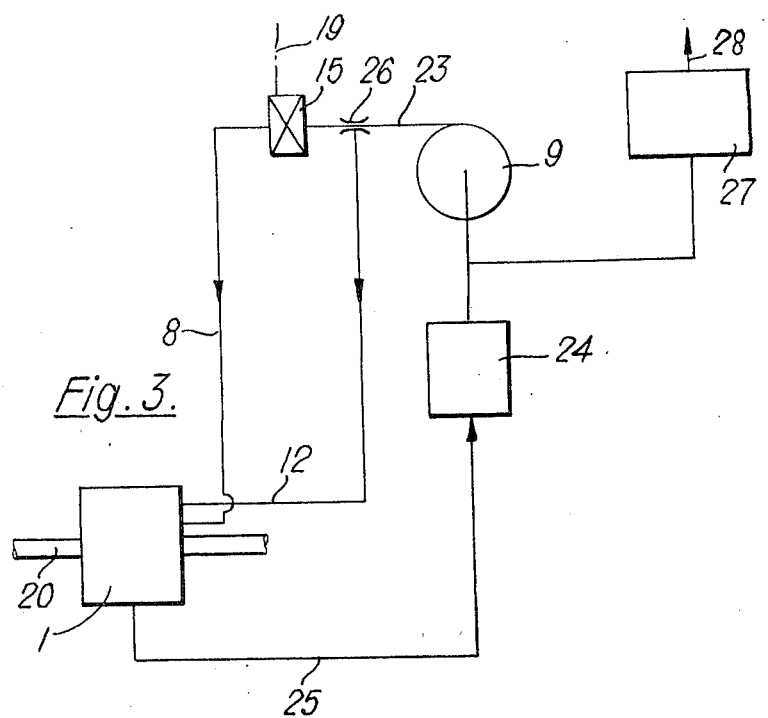

The preferred construction according to the invention for use on a road vehicle is shown in the accompanying drawings, in which:

FIG. 1 shows the retarder itself in axial section;
FIG. 2 shows the variable valve; and
FIG. 3 is a diagram of the oil circuit.

Referring first to FIG. 1, the retarder, shown generally at 1, comprises a series of steel rotor plates 2 carried by a member 3 which is keyed to the propeller shaft 20 of a lorry. The plates 2 are themselves keyed to the member 3 and free to move axially on it. The retarder also comprises a series of stator plates 4 faced on both sides with sintered metallic friction discs 5. These stator plates 3 are keyed to move axially in a casing 6, which wholly encloses both the rotor and stator plates. The casing 6 is recessed to receive an annular piston 7 which constitutes the actuating device for the retarder. The whole interior of the casing 6 is filled with oil, which is circulated through the casing, entering through a pipe 8 and leaving through a pipe 25 (shown in FIG. 3 but not in FIG. 1).

The oil is circulated by a pump 9 (shown only in FIG. 3) driven through a chain 10 from a chain wheel 11 carried by the shaft 20. It is preferable to drive the pump in this way rather than directly from the vehicle engine, because the pump continues to operate when the engine is disconnected from the transmission.

The retarder is actuated by movement of the piston 7 to the left as seen in FIG. 1 to clamp the stator and rotor plates together. The actuating pressure is that of oil introduced into the casing 6 to act on the piston 7 through a pipe 12. The other side of the piston 7 is exposed to the pressure prevailing in the interior of the casing 6. In order to keep friction low, the piston 7 has no sealing rings. A certain amount of flow of oil past the piston does not matter.

The variable valve is shown at 15 in FIG. 2 and comprises a casing which houses a needle valve member 16 which is urged into the position shown by a spring 17 against the pressure in a bore 18 through which the oil flows. The valve member 16 is shown in the closed position in which it throttles flow through the bore 18, and when the retarder is not actuated it is retracted against the spring 17 through a Bowden cable 19 which runs to a lever in the driver's cab. The ends of the bore 18 are tapped at 21 and 22 to receive a pipe 23 and the pipe 8 respectively.

FIG. 3 shows the oil circulation circuit, which includes a heat exchanger 24 in a pipe 25 between the retarder 1 and the pump 9. The pump delivers oil through the pipe 23 to the valve 15, and from the valve through the pipe 8 to the retarder 1. The pipe 12 runs from the low-pressure point of a venturi 26 inserted in the pipe 23 and forms a tapping through which oil is supplied to the piston 7. The pump 9 is preferably of the well-known sliding-vane type of positive displacement pump. The system includes a reservoir 27 containing a supply of oil to replace any leakage out of the system. This reservoir may be vented to atmosphere at 28. When the lorry is travelling on level ground, the driver opens the valve 15 to its maximum extent. Although the pump 9 is then running, the pressure in the pipe 12 is less than that downstream of the valve, and therefore than that in the retarder, so the piston 7 is urged to the right as seen in FIG. 1 by the pressure difference. When the lorry begins to descend a gradient, the driver reduces the passage in the valve 15 for the flow of oil, thus creating a pressure difference across the valve and increasing the pressure at the inlet end of the pipe 12. Accordingly the retarder is actuated to produce a braking effect on the propeller shaft 20. If thereafter the vehicle speed increases, the pump will run faster and there will be an increased pressure at the inlet to the pipe 12, and accordingly the plates of the retarder will be more firmly pressed together. If the speed of the vehicle is reduced, the braking will similarly be reduced. The operating pressure in the pipe 12 depends, of course, on the construction of the retarder and the weight of the vehicle, but may, for example, be 100 lbs/sq.inch (7 kg/cm$^2$).

Numerous modifications may be made. Thus, with the type of retarder shown, the arrangement of the plates may be reversed, those faced with friction material rotating and the others being held stationary. Again, the annular piston in the retarder shown may be replaced by several individual pistons.

The pump may of course be driven in any suitable way other than that shown.

A separate heat exchanger may be unnecessary if the retarder casing is designed to act as a heat exchanger. Moreover, the capacity of the casing may be such that a separate oil reservoir is unnecessary.

Finally the actuator may take the form of a hydraulic piston and cylinder outside the retarder, with mechanical means for transmitting operating forces to the retarder.

I claim:

1. In a vehicle retarder system comprising a frictional retarder including hydraulic pressure-operated control means for controlling the retarding torque applied by said retarder and circulating means for circulating cooling liquid through said retarder, the improvement wherein said circulating means comprises a positive displacement pump having an outlet, means operatively connecting said pump to said vehicle for operation at a speed directly related to the speed of said vehicle, means including an adjustable throttle valve connecting said outlet with said retarder, said throttle valve controlling the resistance to flow of said cooling liquid from said pump to said retarder wherein the opening of said throttle valve is not responsive to changes in pressure of the cooling liquid whereby the delivery pressure of said cooling liquid from said pump upstream of said throttle valve is controlled, said throttle valve including means preventing total closure thereof, and means connecting said pump outlet upstream of said throttle valve with said control means, said control means being responsive to the pressure differential between the pressure of said cooling liquid in said retarder downstream of said throttle valve and the pressure in said control means, whereby when said throttle valve is fully opened, said pressure differential is such that said control means causes said retarder to be inoperative, but when said throttle valve is partially closed and throttles said flow of cooling liquid to said retarder, said pressure differential is dependent on the speed of said pump and hence on the speed of said vehicle, thereby increasing said retarding torque as said vehicle speed is increased.

2. A vehicle retarder system according to claim 1 in which said retarder comprises engaging frictional surfaces, and one or more springs are provided in the retarder to separate the engaging frictional surfaces but to yield against the differential pressure when the retarder is actuated.

3. A vehicle retarder system according to claim 1 in which the retarder comprises rotary and stator plates urged together by an annular piston to which pressure is applied from said pump outlet upstream of said throttle valve.

4. A road vehicle having a transmission and incorporating a retarder system according to claim 1 in which the cooling liquid-circulating pump and rotary parts of the retarder are driven by the same shaft in the transmission.

5. A vehicle retarder system according to claim 1 wherein said means connecting said pump outlet with said control means comprises a venturi in said circulating means between said pump outlet and said throttle valve, and a liquid line leading from the low pressure point of said venturi to said control means.

* * * * *